(12) United States Patent
Goris

(10) Patent No.: US 6,664,759 B1
(45) Date of Patent: Dec. 16, 2003

(54) MANUALLY RECHARGEABLE POWER SYSTEM

(75) Inventor: Andrew C. Goris, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/217,626

(22) Filed: Aug. 14, 2002

(51) Int. Cl.[7] .............................................. H01M 10/46
(52) U.S. Cl. ...................................... 320/107; 320/112
(58) Field of Search ................................. 320/101, 107, 320/110, 112, 114, 115, 166; 429/96, 97, 98, 99, 100; 290/1 E, 43, 54

(56) References Cited

U.S. PATENT DOCUMENTS 4,360,860 A  *  11/1982  Johnson et al.
5,630,155 A  *   5/1997  Karaki et al.

\* cited by examiner

*Primary Examiner*—Edward H. Tso

(57) ABSTRACT

A manually rechargeable power system includes a generator operable to generate electrical energy. A capacitor is operable to store the electrical energy generated by the generator. The generator and/or capacitor may be housed in a housing configured to replicate a size and a shape of one or multiple batteries.

22 Claims, 4 Drawing Sheets

MANUALLY RECHARGEABLE POWER SYSTEM

TECHNICAL FIELD

The present invention relates generally to rechargeable power systems.

BACKGROUND ART

It is generally known to provide a rechargeable power source, such as a battery for use with many electrically-powered devices. In the recharging process, an outside current is applied to a battery cell in the opposite direction of normal electron flow through the battery cell. This reverses the earlier reaction that occurs during discharge, typically restoring the anode to its metallic state and re-oxidizing the positive electrode. Such batteries are only good for a limited number of recharges, and recharging requires an external power source.

SUMMARY

One embodiment of the present invention includes a manually rechargeable system comprising: a generator adapted to generate electrical energy; a rotatable member rotatably mounted to said generator; a cord having an end affixed to the rotatable member; a capacitor adapted to store the electrical energy generated by said generator; and a housing substantially enclosing at least one of the generator, the rotatable member, and the capacitor, said housing having an aperture such that the cord may pass through the aperture, said housing being configured to replicate a shape and a size of one of a battery and a bundle of batteries.

Another embodiment of the present invention includes a manually rechargeable system comprising: generator means to generate electrical energy; storage means to store the electrical energy; delivery means to deliver the electrical energy; and housing means to house the generation means, storage means, and delivery means, wherein the housing means is configured to replicate a shape and a size of a battery.

Another embodiment of the present invention includes a method for use with a manually rechargeable system comprising the steps of: generating electrical energy using a generator wherein the generator is stored within a housing configured to replicate a shape and a size of a battery; and storing the electrical energy using a capacitor wherein the capacitor is within the housing.

BRIEF DESCRIPTION OF THE DRAWINGS

Features of certain embodiments of the present invention will become apparent to those skilled in the art from the following description with reference to the figures, in which.

DETAILED DESCRIPTION OF PREFERRED EMBODIMENTS

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation.

Figure 1:
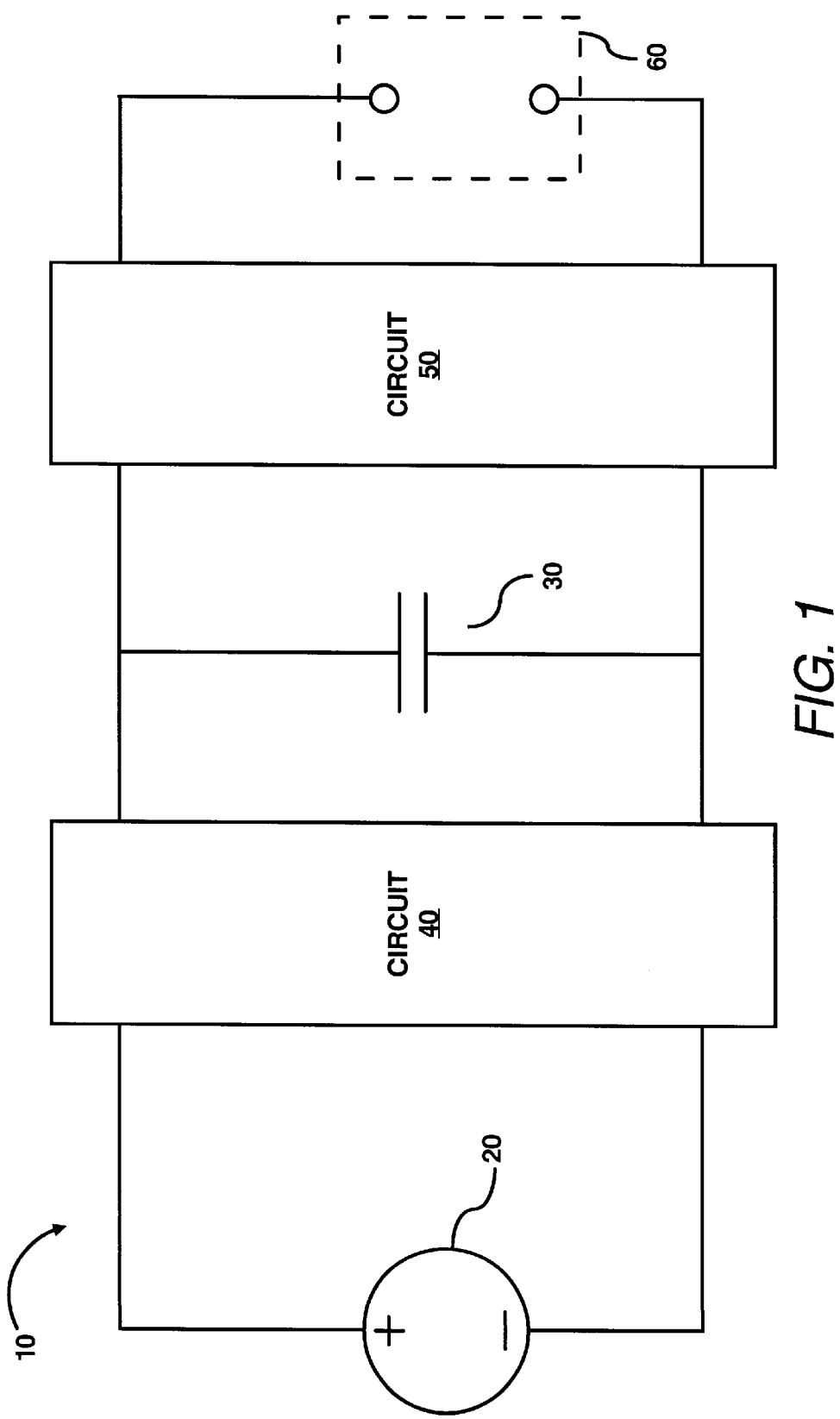
FIG. 1 depicts an exemplary circuit diagram for use with an embodiment of the invention.

FIG. 1 depicts an exemplary circuit diagram 10 for use in accordance with one embodiment of the invention. In FIG. 1, a generator 20 is connected to a capacitor 30. The capacitor 30 may be any of a variety of devices useful for storing electrical energy.

A circuit 40 may be provided to prevent undesirable drain on the capacitor 30. The circuit 40 may be, and may also include or be combined with, a transformer, full-wave rectifier, or other circuitry to provide for AC/DC conversion of current delivered by the generator 20. In one embodiment, an AC/DC converter or full wave rectifier is used when the generator 20 generates an alternating current. The capacitor 30 may then be configured for storage of DC voltage. The circuit 40 may include, or exist as, a combination of other circuitry.

A second circuit 50 may be provided to ensure that the capacitor 30 delivers a relatively consistent power level. In one embodiment, the second circuit 50 includes circuitry for voltage regulation, or for increasing and/or decreasing voltage to ensure delivery of a relatively constant and consistent output, even with varying inputs. In another embodiment, a DC/DC converter is provided to ensure that the capacitor delivers a relatively consistent power level.

A power delivery mechanism 60 is also provided, so that power from the capacitor 30 may be delivered to an external device (not shown). The power delivery mechanism 60 may include two or more electrical contacts, or any other means for delivering electrical current to an external device, including, but not limited to, for instance, inductive charging.

Figure 2:
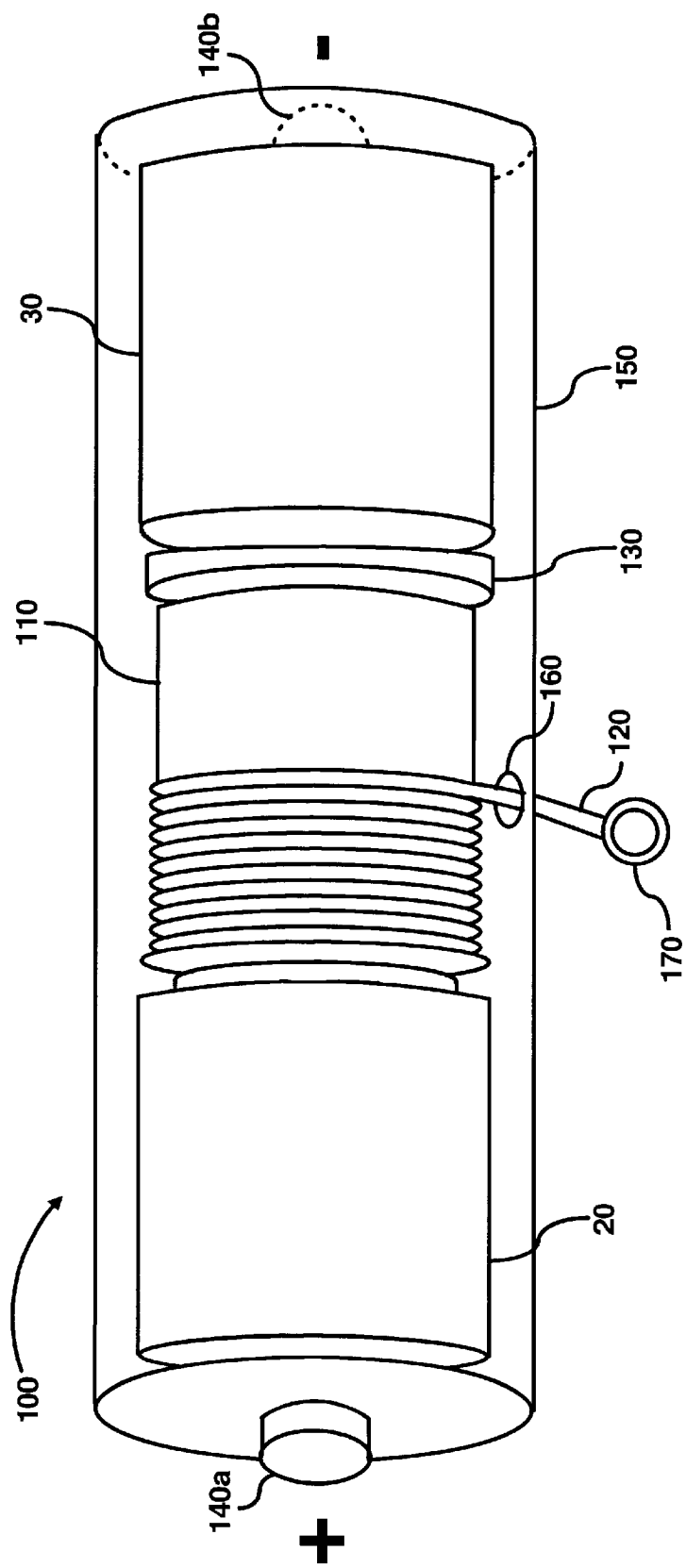
FIG. 2 depicts a lateral, cut-away view of a rechargeable power source, according to an embodiment of the invention.

FIG. 2 depicts a cut-away view of a device 100 in accordance with one embodiment of the invention. In this embodiment, the device 100 includes a self-contained rechargeable power source. The device 100 includes a generator 20. The generator 20 is adapted to be rotatably driven such that exerting a rotation force upon the generator 20 causes the generator 20 to generate electrical energy, for instance in the form of electric current. The generator 20 may be any type of device capable of generating such electrical energy, and is preferably a relatively small device capable of generating a relatively high power electric current.

The device 100 may also include a rotatable member 110 mounted or connected to the generator 20. The rotatable member 110 may be configured to impart energy, in one embodiment, rotational energy, upon the generator 20. The rotatable member 110 may be any device suitable for driving the generator 20, such as a drum, pulley, or sheave. As a sheave, the rotatable member 110 may include grooves threadingly configured thereon so as to substantially guide the winding of a belt or cord thereon. The rotatable member 110 causes the generator 20 to be rotatably driven, thereby causing the generator 20 to create electrical energy. The rotatable member 110 may be rotatably mounted to a spool (not shown) that provides support for the rotatable member 110. The spool may be part of or attached to the generator 20. The rotatable member 110 may be mounted such that the rotatable member 110 rotates freely with relation to the spool or the rotatable member 110 may be spring-mounted to the spool, such that rotation of the rotatable member 110 causes one or more springs (not shown) within the device 100 to load or unload. Any suitable connection arrangement between the rotatable member 110 and the generator 20 may be used, provided at least some of the rotation of the rotatable member 110 may be imparted to the generator 20. The connection arrangement may include, for instance, a mechanism that causes the generator 20 to rotate in only one direction.

The device 100 includes a capacitor 30. The capacitor 30 may be any device suitable for storing electrical energy. In one embodiment, the capacitor 30 is a high capacity or super capacity or ultra capacity capacitor. These capacitors all have a relatively high energy density or capacitance density such that they may store a relatively large amount of electrical energy given their overall size. These capacitors may include thin-film capacitors or any other suitable capacitor.

The device 100 may also include a cord 120 with two ends. The cord 120 may include a flexible cable composed from a durable material such as steel, KEVLAR (available from DuPont), or a composite material. The cord 120 may be wound around and affixed at one end to the rotatable member 110. In this way, the cord 120 may be pulled away from the device 100 to cause the cord 120 to unwind from the rotatable member 110 and generate a rotational force upon the rotatable member 110, thereby causing the rotatable member 110 to rotate and drive the generator 20. In another embodiment, the cord 120 may comprise any device suitable for winding around the rotatable member 110, such as a belt, line, wire, string, cable, or other device. A ring 170 or other grasping means or other device suitable for easily grasping and facilitating pulling the cord 120 may be affixed to the cord 120.

In operating one embodiment of the invention, pulling the cord 120 not only drives the generator 20, and rotates the rotatable member 110 in a first direction (for instance, clockwise), it also causes the one or more springs (not shown) attached to the rotatable member 110 to compress. The cord 120 is then released, and the spring(s) drive the rotatable member 110 to rotate in a reverse direction (for instance, counterclockwise). This rewinds the cord 120 around the rotatable member 110 for further use. In this way, the cord 120 may be pulled repeatedly, each pull providing energy for the capacitor 30. Further, the spring force causing the rotation in a reverse direction may cause the generator 20 to provide energy for the capacitor 30.

In another embodiment of the invention, the rotatable member 110 is not spring-mounted. In such an embodiment, the rotational inertia of the rotatable member 110 causes the rotatable member 110 to continue rotating and rewind the cord 120 around the rotatable member 110 as the rotatable member 110 continues to rotate.

In another embodiment, pulling the cord 120 causes the rotatable member 110 to drive the generator 20 until the rotatable member 110 stops rotating, for instance because the cord 110 is fully extended. In such an embodiment, the generator 20 may be mounted through an overrunning clutch so that rotational inertia of the generator 20 may cause the generator 20 to continue rotating even after the rotatable member 110 has stopped because the cord 120 has reached its fully extended position. The generator 20 may then act as a motor to rewind the cord 120 around the rotatable member 110, drawing electrical energy from the capacitor 30.

Circuitry 130 may be provided to perform any of a variety or combination of functions. For instance, the circuitry 130 may (i) include a diode to prevent current drain from the capacitor 30, in one embodiment, the diode is between the capacitor 30 and the generator 20, (ii) provide AC/DC conversion of current delivered from the generator 20, for instance through a transformer or full or half wave rectifier, (iii) provide DC/DC conversion or voltage regulation to provide relatively consistent power output, even with varying power input, including providing voltage conversion of the current released from the capacitor to a predetermined value, (iv) provide over-voltage protection to avoid damage to the capacitor 30 or other components, (v) provide power from the capacitor 30 to run the generator 20 as a motor to rewind the cord 120, or (vi) a combination of these or other circuitry functions.

One or more positive electrical contacts 140a and negative electrical contacts 140b may be provided and are preferably configured for delivery of electric current from the capacitor 30. These contacts serve as electrically conductive terminals and are in electrical communication with the capacitor. A housing 150 may also be provided to house the various internal components of the device 100. The housing 150 serves to provide a protective cover and for storage of these internal components within the device 100. In one embodiment, the housing 150 is of a size and shape to replicate the shape and size of a battery, such that the entire device may be substituted for a battery (e.g. AAA, AA, D, 9 volt, or even larger batteries, etc.). In another embodiment, the housing 150 is of a size and shape to replicate the shape and size of a bundle of batteries, such that a single device 100 may be substituted for a plurality of batteries. FIG. 2 shows how, in such an embodiment, a single device 100 may replace multiple batteries stacked on end. For instance, the housing 150 may be of a shape and size to replace two D-cell batteries stacked one on top of the other. In another embodiment (not shown), the housing 150 may be of a shape and size to replace multiple batteries lined up alongside on another. For purposes of this disclosure a bundle of batteries means any arrangement, including the foregoing arrangements, where the housing 150 is such that it may replace multiple batteries. The housing 150 preferably includes an aperture 160 such that the cord 120 may pass through the aperture 160, thereby making the cord 120 available outside of the housing 150. As discussed above, the cord may then be pulled away from the device 100, so as to impart a rotational force upon the rotatable member 110, thereby driving the generator 20.

To the extent that the generator 20 and/or other components within the device 100 are made smaller, a larger, and higher capacity, capacitor 30 may be used.

Figure 3:
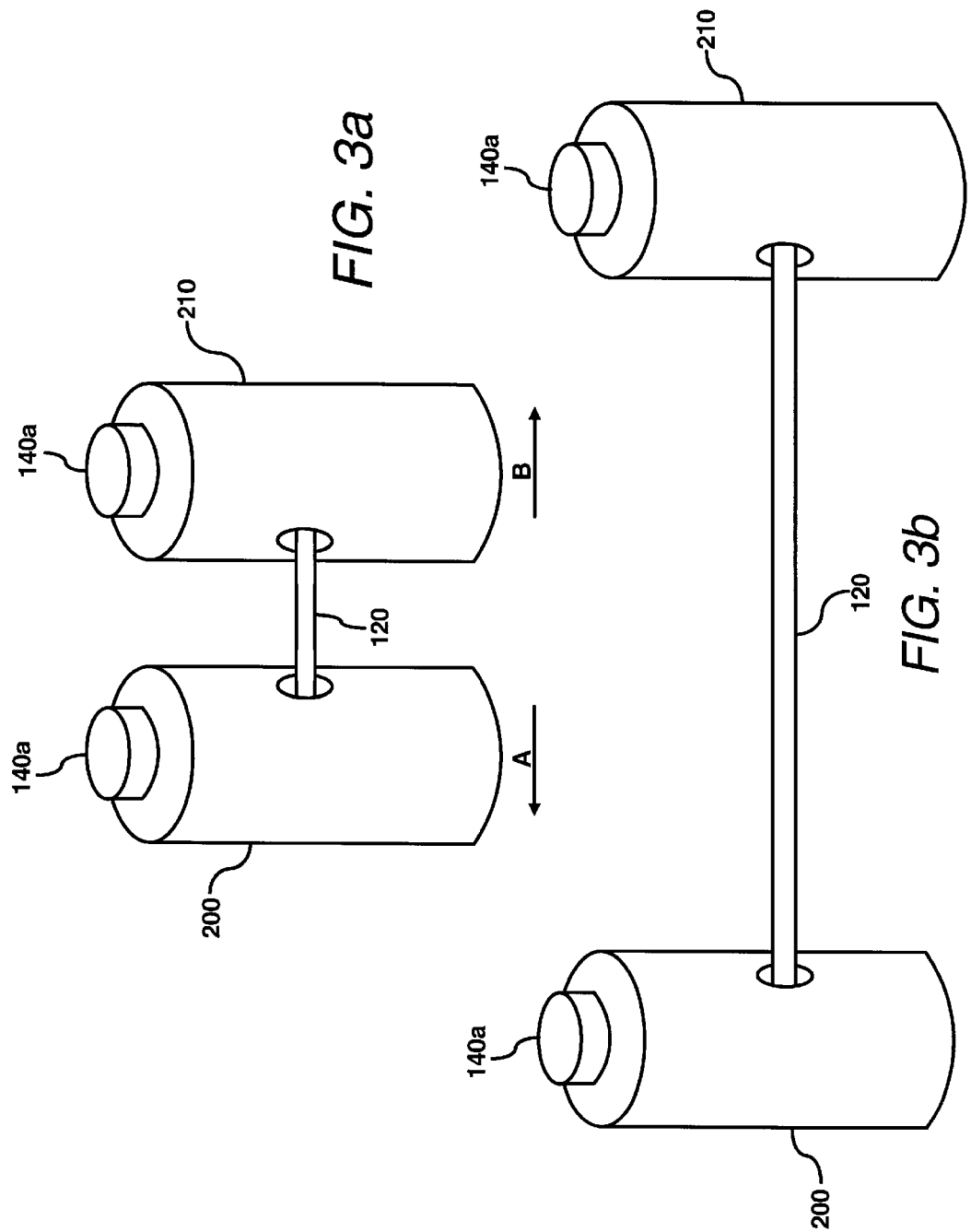
FIG. 3a depicts a perspective view of a rechargeable power source, according to another embodiment of the invention.
FIG. 3b depicts a perspective view of a rechargeable power source, according to another embodiment of the invention.

FIG. 3a depicts another embodiment of the invention, wherein a pair of rechargeable units 200 and 210 are attached to a single cord 120. In this embodiment, each of the units 200 and 210 may be similar to the device 100 described in FIG. 2, with the relevant internal components thereof. Positive electrical contacts 140a are also visible in this drawing.

This embodiment of the invention provides the useful feature of convenience in manually recharging multiple rechargeable units. In this embodiment, as the pair of rechargeable units 200 and 210 are moved away from each other, in the direction of arrows A and B, each generator (not shown) within each respective rechargeable unit 200 and 210 is caused to rotate and generate electrical energy.

FIG. 3b depicts a perspective view of an embodiment of the invention similar to that of FIG. 3a. In FIG. 3b, the pair of rechargeable units 200 and 210 are shown fully extended from each other, and still joined by the cord 120. At this point, the rechargeable units 200 and 210 may be brought back together, allowing the cord 120 to wind back around the rotatable member (not shown) within each of the rechargeable units 200 and 210 using any of the aforementioned rewinding methods and/or mechanisms. This drawing also shows the positive electrical contacts 140a.

Figure 4:
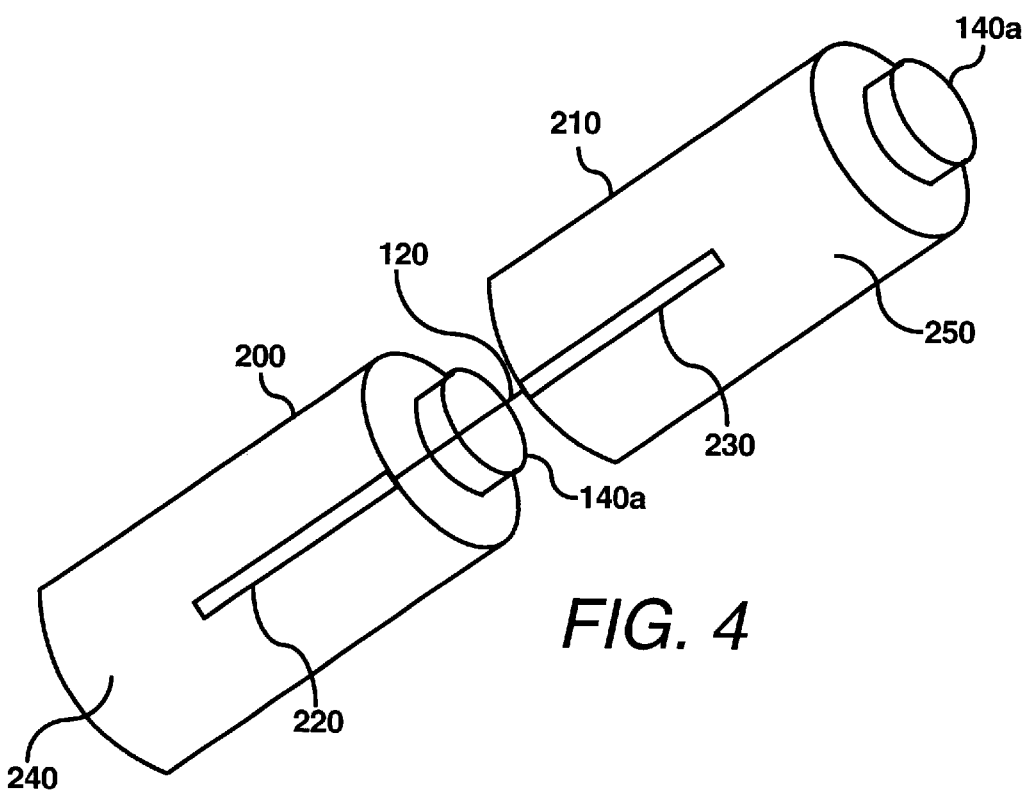
FIG. 4 depicts a perspective view of a rechargeable power source, according to another embodiment of the invention.

FIG. 4 depicts a perspective view of another embodiment of the invention. In FIG. 4, a pair of rechargeable units 200 and 210 are shown, each having a storage groove 220 and 230 in the housing 240 and 250 thereof. The storage groove 220 and 230 of each rechargeable unit 200 and 210 provides an area for placement of the cord 120 when the rechargeable units 200 and 210 are arranged as shown in FIG. 4. The arrangement shown in FIG. 4 is useful for any of a variety of devices where batteries are stacked one on top of the other, for instance in a flashlight. FIG. 4 also shows the positive electrical contacts 140a.

While the invention has been described with reference to certain exemplary embodiments thereof, those skilled in the art may make various modifications to the described embodiments of the invention without departing from the scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the scope of the invention as defined in the following claims and their equivalents.

What is claimed is:

1. A manually rechargeable system comprising:

a generator adapted to generate electrical energy;

a rotatable member rotatably connected to said generator;

a cord having an end affixed to the rotatable member;

a capacitor adapted to store the electrical energy generated by said generator; and a housing substantially enclosing at least one of the generator, the rotatable member, and the capacitor, said housing having an aperture such that the cord may pass through the aperture, said housing being configured to replicate a shape and a size of one of a battery and a bundle of batteries.

2. The system of claim 1, further comprising:

at least two electrically conductive terminals each in electrical communication with the capacitor.

3. The system of claim 1, further comprising:

an AC/DC converter connected to the generator for outputting a direct current.

4. The system of claim 1, further comprising:

a full wave rectifier connecting to the generator for outputting a direct current.

5. The system of claim 1, wherein said rotatable member is spring-loaded.

6. The system of claim 1, wherein the generator generates a force to rewind the cord around the rotatable member, after the cord is extended.

7. The system of claim 1, further comprising:

an electrical circuit to control the transfer of energy from the generator to the capacitor.

8. The system of claim 1, further comprising:

a diode to substantially prevent current drain from the capacitor.

9. The system of claim 1, further comprising:

a circuit to provide over-voltage protection for the capacitor.

10. The system of claim 1, wherein said capacitor is adapted to release electrical energy and the system further comprises:

a voltage regulator to regulate the energy released from said capacitor.

11. The system of claim 1, further comprising:

a second generator adapted to generate electrical energy;

a second rotatable member rotatably connected to said second generator and also being affixed to said cord;

a second capacitor adapted to store the electrical energy generated by said second generator; and a second housing to substantially enclose at least one of the second generator, the second rotatable member, and the second capacitor, said second housing having an aperture such that the cord may pass through the aperture, said second housing being configured to replicate a shape and a size of one of a battery and a bundle of batteries.

12. The system of claim 11, wherein each of the housing and second housing additionally comprise:

a storage notch such that the cord may tuck into said storage notch for storage.

13. The system of claim 1, wherein said housing is configured to replicate the shape and size of a battery selected from the group consisting of: AA, AAA, C, D, and 9 Volt batteries.

14. A manually rechargeable system comprising:

generator means to generate electrical energy;

storage means to store said electrical energy;

delivery means to deliver said electrical energy; and housing means to substantially enclose said generation means, storage means, and delivery means, wherein said housing means is configured to replicate a shape and a size of a battery.

15. The system of claim 14, further comprising:

means for imparting energy upon said generator means.

16. The system of claim 15, wherein said means for imparting energy comprises a rotatable member rotatably connected to said generator means.

17. The system of claim 14, further comprising at least one of:

first circuitry means to regulate the transfer of electrical energy between the generator means and the storage means; and second circuitry means to regulate the delivery of electrical energy from the storage means.

18. The system of claim 17, wherein said first circuitry means comprises at least one of transformer functionality and over voltage protection.

19. The system of claim 14, further comprising:
second generator means to generate electrical energy;
second storage means to store said electrical energy;
second delivery means to deliver said electrical energy;
second housing means to substantially enclose said second generation means, second storage means, and second delivery means, wherein said second housing means is configured to replicate a shape and a size of a battery.

20. A method for use with a manually rechargeable system comprising the steps of:
generating electrical energy using a generator wherein said generator is within a housing configured to replicate a shape and a size of a battery; and
storing said electrical energy using a capacitor wherein said capacitor is within said housing.

21. The method of claim 20, wherein the step of generating further comprises the step of:
exerting a rotational force upon said generator to generate electrical energy.

22. The method of claim 20, further comprising the step of:
releasing electrical energy from the capacitor to an external device.

* * * * *